Nov. 4, 1941.   D. G. REMPEL   2,261,181
METHOD FOR MAKING STENCILING MASKS
Filed March 25, 1940   2 Sheets-Sheet 1
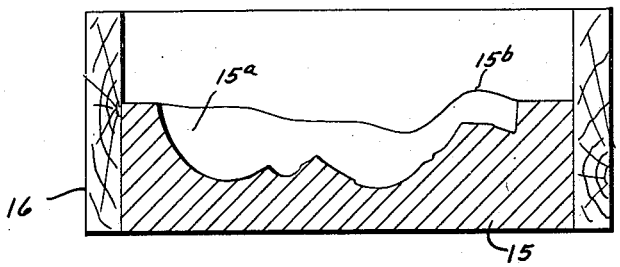
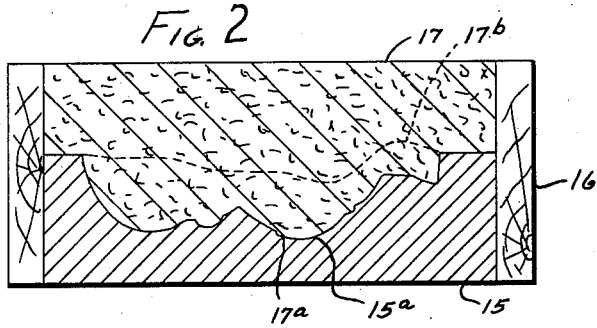
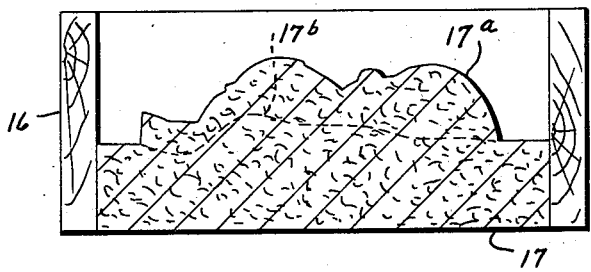
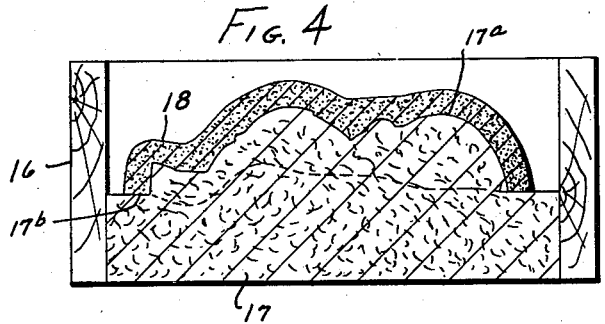
INVENTOR.
DIETRICH G. REMPEL
BY Ralph Barrow Nov. 4, 1941.    D. G. REMPEL    2,261,181
METHOD FOR MAKING STENCILING MASKS
Filed March 25, 1940    2 Sheets-Sheet 2
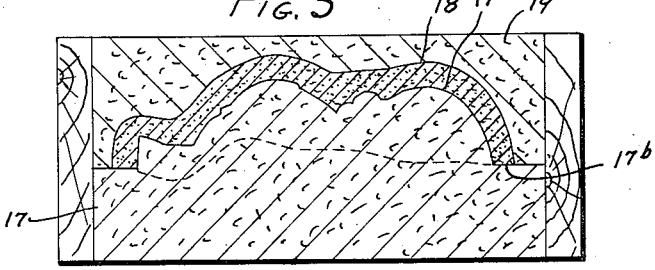
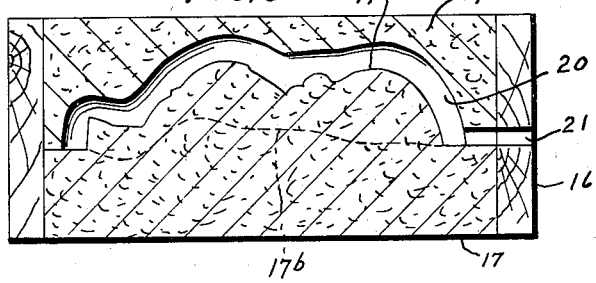
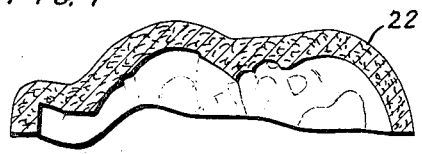
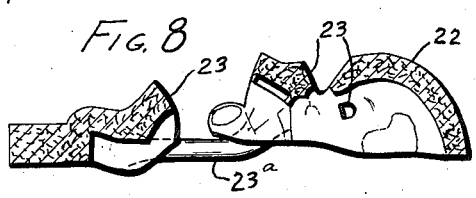
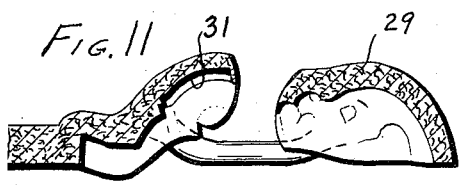
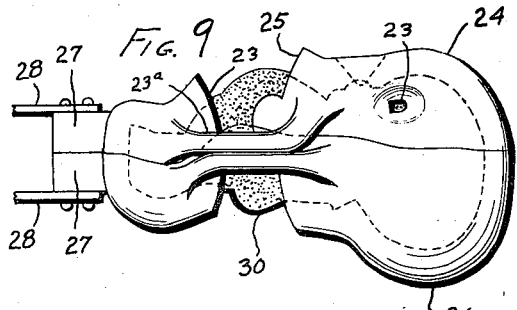
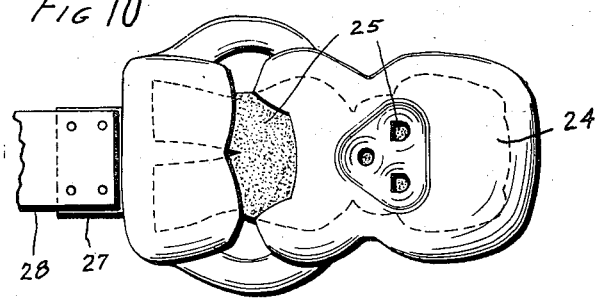
INVENTOR.
DIETRICH G. REMPEL.
BY
Ralph Barrow Patented Nov. 4, 1941

2,261,181

UNITED STATES PATENT OFFICE 2,261,181

METHOD FOR MAKING STENCILING MASKS

Dietrich G. Rempel, Barberton, Ohio, assignor to The Sun Rubber Company, Barberton, Ohio, a corporation of Ohio Application March 25, 1940, Serial No. 325,724

5 Claims. (Cl. 22—190)

This invention relates to methods for making masks for use in stenciling articles, such as rubber character dolls, toys, or the like, with paint spray, and to the method of making patterns for casting said masks.

An object of this invention is to provide a simple, inexpensive method for making masks of the character described.

Another object of the invention is to provide an improved method for making sectional masks for stenciling articles such as hollow-rubber toys, within which masks the articles to be stenciled will fit with precision, but without binding.

Another object of the invention is to provide a method for making a plurality of stenciling masks to be used for different spray-painting operations on the same article, without substantial repetition of the steps of the procedure for making one of said masks.

Another object of the invention is to provide a simple, inexpensive method for making patterns from which a plurality of masks may be made for different spray-painting operations on the same article, for example, within which masks the articles to be painted will fit with precision but without binding.

These and other objects of the invention will be manifest from the following brief description and the accompanying drawings.

Of the accompanying drawings:

Figure 1 is a longitudinal cross-section of apparatus used in the method embodying the invention.

Figures 2 to 6 are similar views illustrating the various steps as they are carried out to produce the pattern-forming mold shown in Figure 6.

Figure 7 is a longitudinal cross-section of a pattern produced in the mold shown in Figure 6.

Figure 8 is a cross-section of one of the patterns, as shown in Figure 7, after it has been apertured and reinforced as desired in the mask section to be cast in metal therefrom.

Figure 9 is a side elevation of a sectional mask, the sections of which have been cast in metal from patterns produced by the improved method.

Figure 10 is a plan view of Figure 9.

Figure 11 is a longitudinal cross-section, of a finished mask pattern produced in the same mold as the pattern shown in Figure 8, but being apertured and reinforced to produce a mask for a different paint-spraying operation on the same class of articles being stenciled.

Referring particularly to Figures 1 and 2 of the drawings, the numeral 15 designates a preformed matrix, which may be the cavity member of a two-part sectional mold used for vulcanizing the articles to be stenciled, or it may be a substantial duplicate thereof. The member 15, shown to illustrate the present invention, has a cavity 15$^a$ therein designed for shaping the front half of a hollow rubber character doll, the surface 15$^b$, for registering with the other section of the mold (not shown), being irregular to correspond with the longitudinal shape of the doll, in known manner.

In carrying out the invention, a non-shrinking plastic material, such as plaster of Paris in pliable condition, may be pressed or poured into the box 16, to fill the cavity 15$^a$ and the space within the box above the mold section, as shown in Figure 2. When the plaster of Paris hardens or sets, the cavity member 15 is removed, leaving a male plaster mold 17, having an impression or projection 17$^a$ and an irregularly curving face 17$^b$ thereon corresponding with the cavity 15$^a$ and curved registering surface 15$^b$, respectively, on matrix 15.

The box 16 next may be inverted (see Figure 3) and, after a suitable lubricant, such as soap solution, has been applied to the surface of mold 17, to prevent adhesion between the mold and plaster subsequently applied thereto, the projecting form 17$^a$ of the mold 17 is covered by a layer 18 of plastic material, such as modelling clay, wax, or the like, adapted to be plied or kneaded into desired shape, and which is readily separable from the mold surfaces, but not necessarily being required to harden or set. The thickness and outer contour of this layer is made the same as that desired in the metal mask sections to be produced by the process, the bottom edges of the layer conforming to the irregular registering surface 17$^b$ of the mold 17, as illustrated in Figure 4.

After the layer 18 has been formed to desired shape and thickness, the box 16 is completely filled with plaster of Paris, the plaster thereby conforming about the layer 18 to provide, when hardened or set, a female plaster mold 19 having a cavity 19$^a$ (see Figure 5). The face 19$^b$ of the female mold 19 in this manner is formed for accurately registering with the curved face 17$^b$ of male mold 17.

The female plaster mold 19 and the clay layer 18 may be removed from the box 16, and the plaster mold replaced therein, as shown in Figure 6, to provide a cavity or chamber 20 of the same shape or outline as plastic layer 18. After mold 19 has been lubricated in the manner of mold 15, plaster of Paris, in liquid form, may now be poured into cavity 20, through a gate 21 provided through box 16 and the female plaster mold 19, which when it becomes hard or set, is readily removable from between the two halves of the plaster mold, thus producing a blank pattern 22. This step may be repeated as often as necessary to produce the required number of blank mask patterns 22, one of these blanks being shown in Figure 7.

The blank plaster patterns 22 may now have plaster of Paris bridges 23ª, 23ª, built thereon to reinforce and support portions of the patterns which may be weakened or unsupported by cutting apertures 23, 23 therein, as desired in the finished stenciling mask for spray-painting certain portions of character dolls. The finished patterns 22 in Figure 8, for example, provide openings in masks for spray-painting the pants, eyes, and lips of character dolls, but not necessarily in the same colors. At this stage plaster of Paris portions 27ª, 27ª may be built onto the pattern 22 for forming supporting lugs 27, 27 on the finished mask section, as desired.

From the apertured plaster pattern 22 shown in Figure 8, any number of mask sections 24 may be cast in metal, such as aluminum, in the usual manner, the finished mask sections having apertures 25, 25 therein, corresponding to the apertures 23 in the patterns 22 thereof. Figures 9 and 10 show a finished metal mask section 24, together with a mating mask section 26 cast from a plaster pattern produced by the same method described above.

The mask sections 24 and 26 have the supporting lugs 27 thereof secured to a pair of relatively shiftable arms 28, 28, of suitable apparatus (not shown) for relatively moving the mask sections toward and from mating relation about a character doll 30, and for rotating the mask while paint is sprayed on the doll, through the apertures in the mask. Apparatus suitable for this purpose is shown and described in copending application, Serial No. 280,979, filed June 24, 1939.

As illustrated by means of Figure 11, the blank patterns 22 of Figure 7 may be apertured and reinforced, to be used in casting apertured mask sections 29, similar to mask 24, but for spray-painting other portions of dolls 30, such as a representation of a coat on the doll, in other colors than the ones used with mask section 22. In this connection, the plaster mask 29 may be recessed as at 31, so that there will be no contact between the inside surface of the mask made therefrom and the previously painted representation of pants, for example, on the dolls to cause the paint to smear. This eliminates the necessity of chipping or cutting out such recesses in each of the metal mask sections.

Plaster of Paris for carrying out the method of this invention is particularly suitable because it will not shrink appreciably upon hardening or setting, but other materials having substantially the same qualities may be used. This non-shrinking quality in such materials results in the contour 15ª of male mold 15, and hence the cavities of mask patterns 22, having substantially the same dimensions as the contour of the dolls vulcanized in mold section 15 or duplicates thereof, which dolls are to be stenciled by means of the metal masks made from the patterns 22, after they are apertured and reinforced, as described. As the mask sections 24 and 26 are cast usually in aluminum from the finished plaster patterns 22, and as aluminum shrinks substantially the same amount as the vulcanized rubber of the dolls, upon cooling of either, the dolls 30 will fit in the sectional mask, as shown in Figures 9 and 10, with precision, without substantial binding action. This facilitates placing of dolls into the mask as well as removing the dolls therefrom.

Modifications of the invention may be resorted to without departing from the spirit thereof or the scope of the appended claims.

What is claimed is:

1. The method for making patterns for hollow article-receiving castings of the character described, comprising the steps of forming a substantially non-shrinking plastic material in the article-forming cavity of a preformed matrix to provide a first mold member having an impression, removing said preformed matrix from said first mold member, covering the impression of said first mold member with a layer of pliable plastic material adapted to be formed to desired shape and thickness, covering said layer with plastic material to form a second mold member adapted to register with the first mold member, removing said layer of pliable plastic material from between said mold members, and forming a pattern of substantially non-shrinking plastic material in the cavity between the registering mold sections, whereby the cavity of a metal casting made from said pattern will be proportionately smaller than the cavity of said first mold member as determined substantially only by the shrinkage of the metal casting.

2. The method for making article-stenciling masks comprising the steps of forming substantially non-shrinking plastic material in the article-forming cavity of a preformed matrix to provide a first mold member having an impression, corresponding to the contour of the articles, forming a layer of pliable plastic material about the impression of said first mold member, forming plastic material about said layer to provide a second mold member in registry with said first mold member, removing said layer of pliable plastic material from between said first and second mold members, forming a pattern of substantially non-shrinking plastic material in the cavity between said first and second mold members, and making a metal casting from said pattern, whereby said casting will have a cavity of substantially the shape and size of the article-forming cavity of said matrix.

3. The method for making masks for stenciling or spray-painting articles, comprising the steps of providing a matrix in which the articles to be painted are formed or a duplicate thereof, forming substantially non-shrinking plastic material in the article-forming cavity of said matrix to provide a first mold member having an impression corresponding to the contours of the articles, forming a layer of pliable plastic material about the impression of said first mold member, forming plastic material about said layer of pliable plastic material to provide a second mold member in registry with said first mold member, removing said layer of pliable plastic material from between said first and second mold members, forming a pattern of substantially non-shrinking plastic material between the mold members, providing apertures in said pattern as desired in the mask or masks made therefrom for stenciling portions of the articles received therein, and making a metal casting from said pattern.

4. The method for making masks for stenciling or spray-painting articles, comprising the steps of providing a matrix in which the articles to be painted are formed or a duplicate thereof, forming substantially non-shrinking plastic material in said matrix to provide a first mold member having an impression corresponding to the contours of the articles, forming a layer of plastic material about the impression of said first mold member, forming plastic material about said layer to provide a second mold member in registry with said first mold member, removing said layer from between said first and second mold members, forming a pattern of substantially non-shrinking plastic material between the mold members, providing stenciling apertures in said pattern as desired in the mask or masks to be made therefrom for stenciling portions of articles received therein, reinforcing said pattern with plastic material at portions weakened by provision of said apertures, and casting a stenciling mask from said pattern.

5. The method for making patterns for casting article-stenciling masks or the like, comprising the steps of providing a matrix having a cavity in which the articles to be stenciled are formed or a duplicate of said matrix, forming substantially non-shrinking, quick-setting plastic material in said matrix to provide a first mold member having an impression from the matrix corresponding to the exact contours of the articles, forming a layer of pliable plastic material over the impression in said first mold member, forming substantially non-shrinking, quick-setting plastic material about said layer to provide a second mold member in registry with said first mold member, removing said layer of pliable plastic material from between said first and second mold members, supplying non-shrinking, quick-setting plastic material between said first and second mold members to provide a pattern, modifying portions of said pattern as desired in the mask or masks to be made therefrom, and reinforcing said pattern at portions weakened by modifying the same.

DIETRICH G. REMPEL.